United States Patent [19]

Heinemann et al.

[11] Patent Number: 4,465,383
[45] Date of Patent: Aug. 14, 1984

[54] HYDRODYNAMIC BEARING

[75] Inventors: Otto Heinemann, Ennigerloh; Helmut Lucke, Beckum; Hubert Grothaus, Iburg-Glaue; Helmut Krumme, Wadersloh; Leonhard Linzel, Oelde; Werner Schossler, Ahlen; Burkhard Heiringhoff, Oelde, all of Fed. Rep. of Germany

[73] Assignee: Krupp Polysius AG, Beckum, Fed. Rep. of Germany

[21] Appl. No.: 387,442

[22] Filed: Jun. 11, 1982

[30] Foreign Application Priority Data

Jun. 30, 1981 [DE] Fed. Rep. of Germany ....... 3125740

[51] Int. Cl.$^3$ .................... F16C 32/06; F16C 37/00
[52] U.S. Cl. .................................. 384/100; 384/116; 384/313
[58] Field of Search ............... 384/100, 114, 117, 116, 384/399, 316, 313, 317, 314, 318, 306, 309, 311; 308/5 R; 29/116 AD, 113 AD

[56] References Cited

U.S. PATENT DOCUMENTS

| | | | |
|---|---|---|---|
| 3,887,245 | 6/1975 | Rouch | 308/1 R |
| 4,099,801 | 7/1978 | Korrenn et al. | 384/116 |
| 4,320,926 | 3/1982 | Heinemann et al. | 384/100 |
| 4,322,116 | 3/1982 | Heinemann et al. | 384/100 |

FOREIGN PATENT DOCUMENTS

| | | | |
|---|---|---|---|
| 2851521 | 5/1979 | Fed. Rep. of Germany | 384/100 |
| 184585 | 8/1966 | U.S.S.R. | 308/5 R |

Primary Examiner—Stuart S. Levy
Assistant Examiner—Thomas R. Hannon
Attorney, Agent, or Firm—Learman & McCulloch

[57] ABSTRACT

The invention relates to a hydrodynamic bearing in which a pressure limiting valve is connected to the oil supply to a groove provided at the inlet zone of the bearing element. The oil pump thus can be of considerably smaller dimensions than heretofore, the energy consumption in operation is reduced, and the removal of heat is improved.

7 Claims, 2 Drawing Figures

HYDRODYNAMIC BEARING

BACKGROUND OF THE INVENTION

The invention relates to a hydrodynamic bearing the bearing element of which is arranged so as to be fixed against rotation and has at the inlet zone of its bearing surface a groove which is supplied with oil and is connected via an oil supply line to an oil pump. Bearing constructions of the general class to which the invention pertains are disclosed in U.S. Pat. Nos. 4,320,926 and 4,322,116.

The quantity of oil supplied to a friction bearing is planned according to the amount of heat which is generated in the bearing and is to be removed by the oil. This quantity of oil which is necessary for cooling purposes is always a multiple of the quantity of oil which is required by the bearing in order to produce the hydrodynamic lubricating film. Thus, the latter is drawn in automatically by the bearing from a surplus of oil while the remaining considerably greater quantity of oil is sprayed off in the proximity of the groove.

In known constructions a hydrostatic oil pressure (of 5 to 25 bars) builds up in this groove in operation, the level of the hydrostatic oil pressure depending on the one hand upon the size of the oil stream and on the other hand upon the present size of the gap between the bearing surface and the mounted element. If the gap is large then only a low oil pressure (inlet pressure) is produced; on the other hand, if the bearing surface and the mounted element match each other very well so that there is no significant air gap, then a high inlet pressure is produced in the groove.

The presence of inlet pressure of oil in the groove is desirable since it improves the drawing in of lubricating oil into the bearing and thus increases the reliability of the hydrodynamic lubrication. With increased operational reliability the bearing can be subjected to higher loads.

It is a disadvantage, however, that the level of the inlet pressure varies as a function of the clearances at the time and cannot be accurately predetermined. Therefore, the capacity of the oil pump must be planned for the maximum pressure which may occur. Thus, the known hydrodynamic bearings have the disadvantage that the oil pump must be designed for a very high degree of efficiency and in operation a large amount of energy is consumed by the quantity of oil which is sprayed off under high pressure and not drawn in to the bearing as a lubricating film. It is also a disadvantage that this quantity of oil which is sprayed from the groove does not ensure optimum removal of heat.

SUMMARY OF THE INVENTION

The object of this invention is to avoid the aforementioned shortcomings and provide a hydrodynamic bearing of such construction that the oil pump can be of considerably smaller dimensions, the energy consumption in operation may be reduced, and improved removal of heat is achieved by the proportion of oil which is not used for lubrication.

This object is achieved according to the invention by connecting a pressure limiting valve to the oil supply line or to the groove, in such manner that a constant relatively low inlet pressure (advantageously of 2 to 5 bars) is maintained in the groove. The surplus oil which is not drawn in hydrodynamically by the bearing flows off at this moderate pressure via the pressure limiting valve. As a result of the considerable reduction in the inlet pressure the oil pump can be of significantly smaller dimensions. Thus, at the same time the energy consumption in operation is reduced.

The outlet side of the pressure limiting valve is conveniently connected to a point suitable for cooling of the mounted element, preferably to the outlet zone of the bearing element. In this way particularly effective cooling is achieved with the excess quantity of oil.

DESCRIPTION OF THE DRAWINGS

Two embodiments of the invention are illustrated in the drawings, wherein.

Figure 1:
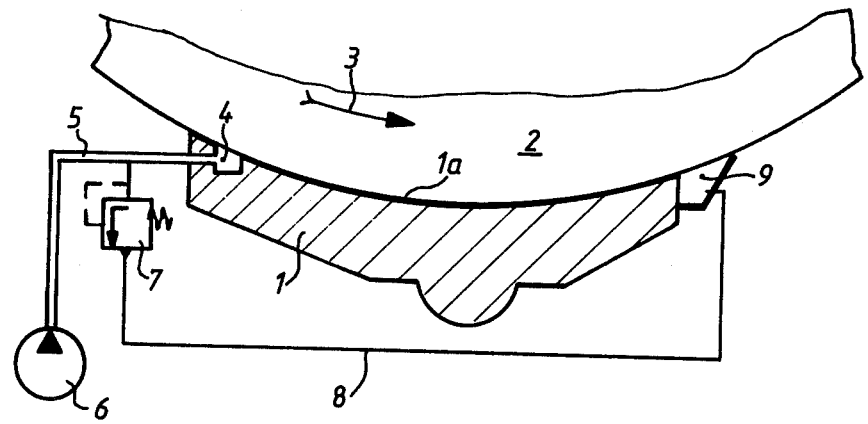
FIG. 1 is a schematic, fragmentary, partly end elevation and partly sectional view of an embodiment.

In the embodiment of FIG. 1 the hydrodynamic bearing contains a bearing element 1 which is fixed in known manner against rotation and on which the rotatably mounted element 2 moves in the direction of rotation of the arrow 3.

A groove 4 in the bearing element confronts the element 2 and is connected to an oil pump 6 via an oil supply line 5. The groove is located at the inlet zone of the bearing surface 1a of the bearing element 1.

A pressure limiting valve 7 has its inlet side connected to the oil supply line 5 and its outlet side connected via a line 8 to a trap 9 located at the outlet zone of the bearing element 1.

The pressure limiting valve 7 maintains a predetermined, selected inlet pressure (for example 2 bars) in the groove 4. The lubricating oil is drawn into the gap at the inlet zone by the rotatably mounted element 2 and there forms the hydrodynamic lubricating film. The surplus oil passes through the pressure limiting valve 7 and the line 8 into the trap 9 where it is taken up by the periphery of the rotatably mounted element 2. Instead of this arrangement, or additionally, oil which is led off via the pressure limiting valve 7 can also be supplied at another point to the rotatably mounted element 2 and thus remove frictional heat from the bearing.

Figure 2:
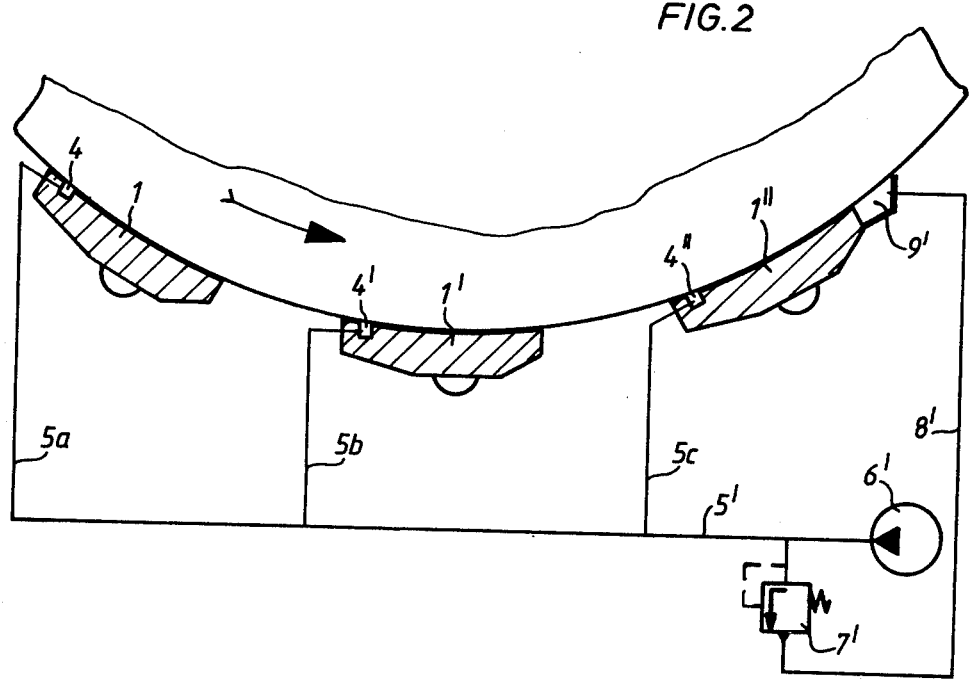
FIG. 2 is a similar view of a second embodiment.

In the embodiment shown in FIG. 2 the bearing contains a series of arcuately spaced bearing elements 1, 1', 1" which are constructed as segments fixed against rotation and each having a groove 4, 4', 4", respectively, at the inlet zone of its bearing surface.

The grooves 4, 4', 4" are connected via a main line 5' and branch lines 5a, 5b, and 5c to a common oil pump 6'. A pressure limiting valve 7' is connected to the main line 5', the outlet side of the valve being connected via a line 8' to a trap 9' at the outlet zone of the last bearing element 1".

Approximately the same relatively low inlet pressure is produced in all the grooves 4, 4', 4". The surplus quantity of oil is drawn off via the pressure limiting valve 7' and facilitates optimum removal of heat in the region of the trap 9', i.e., at the hottest point on the bearing.

The technical advance achieved by the invention is demonstrated particularly clearly by the following comparison of the dimensions of the oil pump in the conventional arrangement and in the arrangement according to the invention:

In the conventional arrangement, if a pressure increase in the groove of 20 bars is expected, then the pump will be dimensioned for at least 25 bars in order to take account of certain variables such as gap ratios. The quantity of oil may be assumed to be 28 l/min (of this the quantity of lubricating oil accounts for 4.5 l/min, while 23.5 l/min are sprayed off or serve to remove heat). The pumping power (proportional pressure and oil quantity) can thus be calculated at 1.64 kW for the conventional arrangement.

If, however, a pressure limiting valve according to the invention is provided and set to limit the pressure in the groove to 2 bars, then the necessary pumping power is calculated at 0.13 kW.

There is a continuous energy saving in operation corresponding to this reduction in the necessary pumping power. This is explained by the fact that, in the arrangement according to the invention, the relatively large quantity of oil which does not serve to form the lubricating film, but is used to remove heat, need not be brought unnecessarily to a high hydrostatic inlet pressure.

The use of one single pressure limiting valve for several bearing elements also gives the additional advantage that the problem of oil distribution over the individual bearing elements without loss of energy is also solved. This means that additional components for oil distribution, such as oil flow distributors, throttles, and the like are thus rendered superfluous.

What is claimed is:

1. A hydrodynamic bearing comprising at least one fixed bearing element having a bearing surface adapted to support a rotatable member, said bearing surface having an inlet zone and an outlet zone spaced from said inlet zone in the direction of rotation of said rotatable member, said bearing surface having a groove therein adjacent said inlet zone; means for supplying oil to said groove; and pressure limiting valve means in communication with said supply means for limiting the pressure of oil at said inlet zone, said pressure limiting valve means having an outlet communicating with said outlet zone.

2. A hydrodynamic bearing according to claim 1 including a series of said bearing elements arcuately spaced from one another.

3. A hydrodynamic bearing according to claim 2 wherein the oil supply means for each of said bearing elements includes a single oil pump.

4. A hydrodynamic bearing according to claim 3 wherein the groove in each of said bearing elements is connected by a branch to a common oil line connected to said pump.

5. A hydrodynamic bearing according to claim 4 wherein said valve means communicates with said common oil line.

6. A hydrodynamic bearing according to claim 4 wherein said valve means has an outlet communicating with the outlet zone of the last bearing element of said series.

7. A hydrodynamic bearing comprising a series of bearing elements adapted to support a rotatable member, said bearing elements being arcuately spaced from one another, each of said bearing elements including an arcuate bearing surface having an inlet zone and an outlet zone spaced from said inlet zone in the direction of rotation of said rotatable member, each of said bearing surfaces having a groove therein adjacent its inlet zone; oil conduit means common to all of said grooves and in communication therewith; a single pump for delivering oil under pressure from a supply thereof to all of said grooves via said conduit means; and pressure limiting valve means having an inlet and an outlet, said inlet being in communication with said conduit means between said pump and said grooves and said outlet being in communication with the outlet zone of the last bearing element of said series.

* * * * *